(12) United States Patent
Nasli-Bakir et al.

(10) Patent No.: US 7,678,224 B2
(45) Date of Patent: Mar. 16, 2010

(54) METHOD FOR REDUCING EMISSIONS AND METHOD FOR PRODUCING A WOODEN PRODUCT

(75) Inventors: Benyahia Nasli-Bakir, Saltsjö-Boo (SE); Hans Ekblom, Handen (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/808,366

(22) Filed: Mar. 25, 2004

(65) Prior Publication Data

US 2004/0250907 A1 Dec. 16, 2004

(30) Foreign Application Priority Data

Mar. 25, 2003 (EP) ................... 03445039

(51) Int. Cl.
*B32B 21/14* (2006.01)
*C09J 5/00* (2006.01)

(52) U.S. Cl. ................... 156/278; 156/305; 427/332; 427/337; 427/341

(58) Field of Classification Search ................. 156/278, 156/305; 427/332, 337, 341
See application file for complete search history.

(56) References Cited

U.S. PATENT DOCUMENTS

| | | | | |
|---|---|---|---|---|
| 3,969,558 A | * | 7/1976 | Sadashige | 428/58 |
| 4,362,827 A | | 12/1982 | Tinkelenberg et al. | |
| 4,376,807 A | | 3/1983 | Cannon et al. | |
| 4,478,966 A | | 10/1984 | Helgesson | 524/13 |
| 4,597,940 A | * | 7/1986 | Hager | 422/32 |
| 4,678,686 A | * | 7/1987 | Park | 427/254 |
| 5,418,282 A | * | 5/1995 | Wiehn | 524/735 |
| 6,022,444 A | | 2/2000 | Haider et al. | |
| 2003/0224122 A1 | * | 12/2003 | Lopez | 427/428 |

FOREIGN PATENT DOCUMENTS

| | | |
|---|---|---|
| DE | 2719769 | 11/1978 |
| DE | 2903254 | 8/1979 |
| DE | 264449 | 2/1989 |
| DE | 4114518 A * | 11/1992 |
| DE | 19949625 | 4/2001 |
| EP | 0006486 | 1/1980 |
| EP | 0027583 | 4/1981 |
| EP | 0006486 B1 | 1/1984 |
| GB | 1572481 | 7/1980 |
| GB | 2062039 A * | 5/1981 |
| JP | 2001-353704 | 12/2001 |
| JP | 2002-337115 | 11/2002 |
| WO | WO 01/38416 | 5/2001 |
| WO | 02/072324 | 9/2002 |
| WO | 02/1072323 | 9/2002 |
| WO | WO 02072324 A1 * | 9/2002 |

OTHER PUBLICATIONS

English Abstract of DE 4,114,518 A.*
English language abstract of DE 2719769.
English language abstract XP-002171075 of JP48072308.
English language abstract of DD 264449.
English language abstract of DE 19949625.
English language abstract of DE 2903254.

* cited by examiner

*Primary Examiner*—Philip C Tucker
*Assistant Examiner*—Sing P Chan
(74) *Attorney, Agent, or Firm*—Kenyon & Kenyon LLP

(57) ABSTRACT

The present invention relates to a method for reducing emissions of one or more gaseous substances from an assembly of at least two pieces of wooden materials, which have been glued together. It also relates to a method for producing a laminated wooden product comprising planing at least one of the sides of an assembly having glue lines exposed, and, treating the one or more planed sides by application of one or more treating substances reactive to one or more gaseous substances emitted from the at least one planed side. Finally, the present invention relates to a laminated wooden product having low emissions.

33 Claims, No Drawings

METHOD FOR REDUCING EMISSIONS AND METHOD FOR PRODUCING A WOODEN PRODUCT

The present invention relates to a method for reducing emissions from a glued wooden product. It also relates to a method for producing a laminated wooden product, a product obtainable by the method, and a low-emitting laminated wooden product.

Emissions of gaseous substances from wooden products may have different origin. Solid wood may itself emit substances such as terpenes and aldehydes, usually referred to as volatile organic compounds (VOC), and some adhesive systems used for joining wood materials may emit various substances from the glue lines. Such emissions may be, for example, formaldehyde from phenolic- or amino resin based adhesive systems, and isocyanates from emulsion polymer isocyanate (EPI) adhesive systems.

There is a growing concern about emission of substances in general, and emission of formaldehyde in particular, from building materials made of glued wood such as laminated beams.

When producing laminated beams, usually, a curable adhesive system is applied onto wooden lamellae, which are subsequently arranged into an assembly of lamellae. The assembly is then pressed, usually under heat or high-frequency electromagnetic fields, and the adhesive system is cured. After pressing the assembly, a planing step is usually performed on the surfaces transversely to the plane of adhesive application in order to remove excess adhesive and any unevenness resulting from assembling the individual lamellae. The final laminated beam will have a plurality of glue lines exposed to open air, as well as newly planed wooden surfaces. It has been found that the exposed glue lines may emit a significant amount of gaseous substances, such as formaldehyde. Also, the newly planed wooden surfaces may emit gaseous substances, such as terpenes and aldehydes.

WO 02/072323 A1 and WO 02/072324 A1 disclose methods of reducing emission of formaldehyde from layered products but do not deal with emissions from an exposed glue line.

It is an object of the present invention to provide a method for reducing emissions from a glued wooden product, and to provide a method for producing a wooden product, which has low emissions of gaseous substances. It is a further object of the present invention to provide a laminated wooden product obtainable by the method and a wooden product having low emissions of aldehydes or terpenes and, finally, a fluid treating composition for use in the methods.

By wooden materials is herein meant any type of materials originating from wood. This includes both materials of solid wood and, for example, materials made of fibres, particles, and chips of wood.

According to the invention it has surprisingly been found possible to achieve the above mentioned objects by a method for reducing emissions of one or more gaseous substances from an assembly of at least two pieces of wooden materials which have been glued together, comprising planing on at least one of the sides having glue lines exposed, followed by treating the at least one planed sides with one or more treating substances reactive to the one or more gaseous substances. Suitably, the pieces of wooden material are wooden lamellae. Suitably, at least one of the gaseous substances is emitted from an exposed glue line. It is also suitable that at least one of the gaseous substances is emitted from a solid wood surface.

According to the invention it has also surprisingly been found possible to achieve the above mentioned objects by a method for producing a wooden product comprising the steps of: applying an adhesive system onto one or more wooden lamellas, assembling two or more wooden lamellas into an assembly, pressing the assembly, planing at least one of the sides of the assembly having glue lines exposed, and, treating the one or more planed sides by application of one or more treating substances reactive to one or more gaseous substances emitted from the at least one planed side. The wooden product is suitably a laminated wooden product.

"Reactive to one or more gaseous substances" refers to a capability of reducing the total emissions thereof with at least 5%, preferably at least 10%, even more preferably at least 25%, most preferably at least 50%.

The invention is not restricted to the use of any particular type of adhesive system. Suitable adhesive systems to be used in the method of the invention are curable adhesive systems such as amino resin based adhesive systems, phenolic resin based adhesive systems and isocyanate based adhesive systems. Examples of amino resin based adhesive systems are melamine-formaldehyde-, melamine-urea-formaldehyde-, and urea-formaldehyde-based adhesive systems. Examples of phenolic resin based adhesive systems are phenol-formaldehyde-, phenol-resorcinol-formaldehyde and resorcinol-formaldehyde based adhesive systems. Examples of isocyanate based adhesive systems are polyurethane based adhesive systems and emulsion polymer isocyante (EPI) based adhesive systems. Suitably, the adhesive is cured during, or in connection to, the pressing step. However, also non-curable adhesive systems such as adhesive systems based on vinylester polymers can be used. Examples of vinylester based adhesive systems are polyvinylacetate- ethylene-vinylacetate- and polyvinylpropionate based adhesive systems.

The application of adhesive onto lamellae and assembling of all lamellae are suitably performed in separate steps. Alternatively, it is also suitable that each lamella is applied with the adhesive system at different points of time, the assembly is gradually built-up with the lamellae most recent having been applied with the adhesive system.

The planing, according to the methods of the invention, is suitably performed on two sides of the assembly having glue lines exposed.

Suitably, the one or more treating substances are reactive to one or more gaseous substances emitted from the glue line. Also suitable, the one or more treating substances are reactive to one or more gaseous substances emitted from solid wood.

The gaseous substances according to the invention may be of different types. One group of substances which may be emitted from a glue line, is aldehydes, such as acetaldehyde, formaldehyde, glutaraldehyde, propionaldehyde, n-butyraldehyde, isobutyraldehyde, hexanal and furfural. Another group of substances which may be emitted from a glue line is isocyanates, such as methyl isocyanate, hexamethylene-1,6-diisocyanate, 4,4-methylenediphenyl isocyanate, toluene 2,4-diisocyanate, and isophorone diisocyanate. Gaseous substances which may be emitted from solid wood are, for example, terpenes such as the monoterpenes α- and β-pinene, 3-carene, and limonene, as well as aldehydes such as acetaldehyde, propanal, butanal, pentanal, hexanal and benzaldehyde.

In a first aspect of the methods of the present invention, one gaseous substance is suitably an aldehyde, preferably formaldehyde. Then, one or more treating substances are suitably reactive to an aldehyde, preferably formaldehyde. Preferably, the one or more treating substances contain an amino or amide group, of which examples of substances are guanamines, urea, thiourea, biuret, semicarbazides, succinamide, hexamethylendiamine, ethanol amine, ethylene amines, proteins, peptides, hydrazides and ammonium salts such as ammonium carbonate, mono- and diammonium phosphate, ammonium sulphide, and ammonium sulphite. Other sulphites, such as potassium or sodium sulphite can also be used. Also proteins like glutenin, casein, and zein, or protein-containing materials such as flour, whey and protein-containing starch. Hydroxy group containing substances may also be used as treating substances such as alcohols and polyvinylalcohol. Also carbohydrates, such as mono- di- and polysaccharides can be used. Preferably, amino- or amido group containing substances are used. Most preferably, the at least one treating substance is urea or a urea derivative.

In a second aspect of the methods according to the invention, one gaseous substance is suitably an isocyanate. Then, one or more treating substances are suitably reactive to an isocyanate. Suitable treating substances include substances containing an amino or amide group, of which examples of substances are guanamines, urea, thiourea, biuret, semicarbazides, succinamide, hexamethylendiamine, ethanol amine, ethylene amines, proteins, peptides, hydrazides and ammonium salts such as ammonium carbonate, ammonium sulphide, and ammonium sulphite. Hydroxy group containing substances may also be used as treating substances such as alcohols and polyvinylalcohol. Also carbohydrates, such as mono- di- and polysaccharides can be used. A further suitable treating substance is water. Preferably, the at least one treating substance is an amino- or amido group containing substance.

In a further aspect of the methods according to the invention, the gaseous substances suitably belong to the group of terpenes. Then, the one or more treating substances are suitably reactive to terpenes. Suitably, the treating substances belong to the group of unsaturated aldehydes, such as alkenals and alkdienals, or hydroxy group containing substances such as alcohols and polyvinylalcohol. Preferably, the at least one treating substance is an unsaturated aldehyde such as pentenal, hexenal, or octenal.

A treating substance may be used in the methods of the invention as a single component. However, the one or more treating substances are suitably components of a treating composition. The treating composition according to the methods of the invention is suitably fluid and suitably comprises a solvent for the one or more treating substances.

Suitable solvents are water, alcohols such as methanol, ethanol and glycols, and esters such as butyidiglycol acetate. Preferably, water is used as solvent. Mixtures of solvents may also be used. The choice of solvent may in some cases affect the swelling of fibres at a wooden surface. Preferred solvents in these cases include alcohols, glycols, or glycolic acids. The treating composition suitably comprises from about 0.01 to about 99 weight %, preferably from about 1 to about 80 weight %, most preferably from about 10 to about 60 weight % of the one or more treating substances. The treating composition suitably comprises an agent for improving the film forming properties of the composition when applied onto a surface, preferably a wooden surface. Suitably, the treating composition comprises a polymer as film forming improving agent, suitably in the form of a polymer dispersion. The polymer dispersion is preferably a dispersion of a polyvinylester, such as polyvinylacetate or its derivatives such as polyvinylacohol, or a polyacrylate dispersion, most preferably a polyvinylalcohol dispersion. The dry content of the film forming improving agent in the treating composition is suitably from about 0.01 to about 50 weight %, preferably from about 0.02 to about 10 weight %, most preferably from about 0.03 to about 2 weight %.

In one preferred embodiment, the treating composition comprises from about 0.01 to about 100 weight %, preferably from about 1 to about 80 weight %, most preferably from about 10 to about 60 weight %, of urea or a urea derivative. In a second preferred embodiment, the treating composition comprises from about 0.01 to about 100 weight %, preferably from about 1 to about 80 weight %, most preferably from about 10 to about 60 weight %, of a reaction product of an alcohol and ammonia. In a third preferred embodiment, the treating composition comprises from about 0.01 to about 100 weight %, preferably from about 1 to about 80 weight %, most preferably from about 10 to about 60 weight %, of an unsaturated aldehyde.

Suitable methods for treating with the one or more treating substances are, for example spraying, roller coating, curtain coating, and coating with an impregnated pad or wetted cloth. Preferably, the treating with the treating substances is made by spraying or by roller coating. When two sides of the assembly is treated with the one or more treating substances, both sides are suitably treated simultaneously. In this case, suitably, the upper side is treated by spraying and the under side is treated by roller coating. It is also possible to apply the one or more treating substances in the form of strands, which to an extent of more than 50% covers the glue lines, preferably to an extent of more than 80%, most preferably to an extent of substantially 100%.

It is also possible to treat the sides of the assembly not having any glue lines exposed with the one or more treating substances.

The one or more treating substances are suitably applied in an amount to achieve the desired effect, and the amount depends on which treating substance is used. If a treating composition is used, the treating composition is suitably applied in an amount of from about 0.1 to about 100 g/m$^2$, preferably from about 1 to about 50 g/m$^2$, most preferably from about 5 to about 30 g/m$^2$.

Also a drying step can be added after the one or more treating substances have been applied. Suitable drying means are, for example, infra-red radiation, blowing with warm air, and microwave heating.

The treating with the one or more treating substances is suitably performed shortly after the planing, but can also be made at a later stage after the planing, suitably up to about 30 days after the planing, preferably from about 0.1 seconds to about 5 days after the planing, more preferably from about 0.5 seconds to about 1 hour after the planing, most preferably from about 0.5 seconds to about 60 seconds after the planing.

In a preferred embodiment of the present invention, a laminated beam is manufactured by applying one of a melamine-formaldehyde-, melamine-urea-formaldehyde-, or phenol-resorcinol-formaldehyde- based adhesive system onto a plurality of wooden lamellae. The lamellae are joined into an assembly and pressed at elevated temperature. The resulting beam is subsequently planed on both sides having exposed glue lines in the longitudinal direction, which sides are then treated by application of a fluid treating composition as described above.

The laminated wooden product according to the invention is suitably a laminated beam, in which is also included other laminated structural materials such as laminated veneer lumber.

It has also been found possible to obtain a product having lower emissions of formaldehyde than similar products made by gluing with adhesive systems based on formaldehyde based resins. Therefore, the invention also concerns a product obtainable by the method of the invention as described above.

The laminated wooden product obtainable by the method of the invention suitably has a formaldehyde emission, according to JAS, standard for structural glued timber MAFF, Supplement No 992, of less than about 0.5 mg/l, preferably less than about 0.3 mg/l.

The invention further concerns a laminated wooden product comprising at least two lamellae, which have been joined with an adhesive system based on a formaldehyde based resin. This laminated wooden product has a formaldehyde emission, according to JAS, standard for structural glued timber MAFF, Supplement No 992, of less than about 0.5 mg/l, preferably less than about 0.3 mg/l.

Furthermore, the invention concerns a laminated wooden product comprising at least two lamellae joined with a glue line, the laminated wooden product comprises a substance, other than water, reactive to aldehydes, isocyanates or terpenes in close proximity of the surface of the side of the product having at least one exposed glue line.

Each laminated wooden product according to the invention mentioned above is suitably a laminated beam, in which is also included other laminated structural materials such as laminated veneer lumber.

The invention will now further be described in connection with the following examples which, however, not should be interpreted as limiting the scope of the invention.

EXAMPLE 1

A melamine-urea-formaldehyde (MUF) resin and a conventional acidic hardener was tested as well as a low-formaldehyde-emitting adhesive system comprising a melamine-urea-formaldehyde (MUF) resin, a phenol-resorcinol-formaldehyde (PRF) resin and an acid.

For each adhesive system, the emission from glued structures was tested according to JAS MAFF992. Two sets of glued structures were manufactured for each adhesive system. Five lamellae (135×150×29 mm) of spruce were assembled and glued together with a mixture resin and hardener spread in an amount of 400 g/m². After pressing and conditioning (20° C. at 65% relative humidity), two pieces of 75×150×135 mm were cut out. The butt-ends (opposite the fibre direction) were sealed with aluminium foil leaving two surfaces of 75×150 mm having exposed glue lines. The glued structures were planed on the two sides having exposed glue lines and one of the structures for each adhesive system was treated by spraying on both planed sides with an aqueous composition comprising 40 weight % of urea, and 0.07 weight % of polyvinylalcohol, while the other structure was left untreated. Each piece was placed in a 40 liter chamber having a beaker with water as a sampler. The emission of formaldehyde, expressed as mg/l in the sample of water, according to the test method, was determined for all structures and is shown in table 1.

TABLE 1

| Adhesive system | Treatment after planing | Formaldehyde emission (mg/l) |
| --- | --- | --- |
| MUF/acid hardener | no | 0.47 |
| MUF/acid hardener | yes | 0.09 |
| MUF/PRF/acid | no | 0.24 |
| MUF/PRF/acid | yes | 0.02 |

It is concluded that the present invention gives a significant reduction of emission of formaldehyde both for a conventional MUF resin based adhesive system and for a low-emitting MUF/PRF resin based adhesive system.

EXAMPLE 2

The same melamine-urea-formaldehyde (MUF) resin and conventional acidic hardener as in Example 1 was tested.

The emission of formaldehyde from glued structures was tested according to an internal test method which is a modified JAS MAFF992 using smaller test pieces. Five lamellae (5×150×150 mm) of spruce were assembled and glued together with a mixture resin and hardener spread in an amount of 380 g/m². After pressing and conditioning (20° C. at 65% relative humidity), pieces of 75×25×10 mm were cut out. The butt-ends (opposite the fibre direction) were sealed with aluminium foil leaving two surfaces of 75×25 mm having exposed glue lines. Two pieces were planed on the two sides having exposed glue lines and one of the pieces was thereafter treated by spraying on both planed sides with an aqueous composition comprising 40 weight % of urea, and 0.07 weight % of polyvinylalcohol. Each piece was placed in a 4 liter chamber having a beaker with water as a sampler. The emission of formaldehyde, expressed as mg/l in the sample of water was determined for both structures after 2 days and 30 days respectively, and is shown in table 2.

TABLE 2

| | Formaldehyde emission (mg/l) |
| --- | --- |
| treatment, 2 days | <0.5 |
| treatment, 30 days | <0.5 |
| no treatment, 2 days | 1.7 |
| no treatment, 30 days | 1.3 |

It is concluded that the method according to the invention gives a long-lasting effect against formaldehyde emission.

The invention claimed is:

1. Method for reducing emissions of one or more gaseous substances, emitted from an exposed glue line of an assembly of at least two pieces of wooden materials which have been glued together with glued surfaces oriented in a first plane, the one or more gaseous substances belonging to the group of aldehydes or isocyanates, comprising planning a surface oriented in a plane transversely to the first plane having glue lines exposed, followed by treating the surface oriented in a plane transversely to the first plane by application of a liquid treating composition containing one or more treating substances reactive to an aldehyde or an isocyanate.

2. Method according to claim 1, wherein one gaseous substance is formaldehyde.

3. Method according to claim 1, wherein one treating substance is urea or a urea derivative.

4. Method according claim 3, wherein said treating composition comprises about 10 to about 60 wt % urea and about 0.03 to about 2 wt % polyvinyl alcohol in the form of an aqueous polyvinyl alcohol dispersion.

5. Method according to claim 1, wherein one treating substance is a reaction product of an alcohol and ammonia.

6. Method according to claim 1, wherein the treating composition comprises from about 1 to about 80 weight % of one or more treating substances.

7. Method according to claim 1, wherein the treating composition comprises from about 0.02 to about 10 weight % of a polymer.

8. Method according to claim 1, wherein the treating composition comprises a polyvinyl alcohol dispersion.

9. Method according claim 1, wherein one treating substance contains an amino or amide group.

10. Method according claim 1, wherein one treating substance is a sulphite.

11. Method according claim 1, wherein one treating substance is an alcohol.

12. Method according claim 1, further comprising planing at two sides having glue lines exposed to provide a first planed side and a second planed side facing opposite the first planed side, and applying said treating composition to both the first and second planed sides.

13. Method according claim 12, further comprising applying said treating composition simultaneously to both the first and second planed sides.

14. Method according claim 13, further comprising orienting the assembly so that the first planed side is facing upward and the second planed side is facing downward prior to applying said treating composition, and thereafter applying said treating composition to the first planed side by spraying and to the second planed side by roller coating.

15. Method according claim 1, wherein said treating composition is applied in an amount of from about 0.1 to about 100 g/m$^2$.

16. Method according claim 15, wherein said treating composition is applied in an amount of from about 1 to about 50 g/m$^2$.

17. Method according claim 16, wherein said treating composition is applied in an amount of from about 5 to about 30 g/m$^2$.

18. Method according claim 1, wherein said treating composition is applied from about 0.5 seconds to about 1 hour after planing.

19. Method according claim 18, wherein said treating composition is applied from about 0.5 seconds to about 1 minute after planing.

20. Method according to claim 1, further comprising a drying step after applying one or more treating compositions, wherein drying is by infra-red radiation, blowing with warm air, or microwave heating.

21. Method for producing a laminated wooden product comprising the steps of:
    (a)-applying an adhesive system onto at least a first surface of one or more wooden lamellas,
    (b)-assembling the one or more wooden lamellas together with one or more further wooden lamellas into an assembly with the first surface facing a second surface of the one or more further wooden lamellas wherein the first and second surfaces are oriented in a first plane,
    (c)-pressing the assembly,
    (d)-planing a third surface of the assembly that is oriented in a plane transversely to the first plane, wherein the third surface having glue lines exposed, and,
    (e)-treating the third surface by application of a liquid treating composition containing one or more treating substances reactive to an aldehyde or an isocyanate emitted from the exposed gluelines.

22. Method according to claim 21, wherein one gaseous substance is formaldehyde.

23. Method according to claim 21, wherein one treating substance is urea or a urea derivative.

24. Method according to claim 21, wherein one treating substance is a reaction product of an alcohol and ammonia.

25. Method according to claim 21, wherein the treating composition comprises from about 1 to about 80 weight % of one or more treating substances.

26. Method according to claim 21, wherein the treating composition comprises from about 0.02 to about 10 weight % of a polymer.

27. Method according to claim 21, wherein the treating composition comprises a polyvinyl alcohol dispersion.

28. Method according to claim 21, wherein the laminated wooden product is a laminated beam.

29. Method according to claim 21, wherein one treating substance contains an amino or amide group.

30. Method according to claim 21, wherein one treating substance is a sulphite.

31. Method according to claim 21, wherein one treating substance is an alcohol.

32. Method according to claim 21, further comprising a drying step after applying one or more treating compositions, wherein drying is by infra-red radiation, blowing with warm air, or microwave heating.

33. Method for reducing emissions of gaseous substances from a glued laminate, comprising the steps of:
    (1) gluing together a plurality of lamellas, wherein the glued surfaces are oriented in a first plane, with an adhesive substance capable of emitting at least one gaseous substance being an aldehyde or an isocyanate, thereby forming a laminated beam having exposed glue lines on a surface oriented in a plane transversely to the first plane and from which surface oriented in a plane transverse to the first plane at least one gaseous substance can be emitted;
    (2) planing said surface oriented in a plane transversely to the first plane having exposed glue lines; and
    (3) treating the surface oriented in a plane transversely to the first plane by application of a liquid treating composition containing one or more treating substances reactive to an aldehyde or an isocyanate, thereby reducing or eliminating the emission of the aldehyde or the isocyanate.

* * * * *